United States Patent
Yang

(10) Patent No.: US 6,789,808 B2
(45) Date of Patent: Sep. 14, 2004

(54) THREE-SECTIONAL GOLF CART STRUCTURE

(76) Inventor: Lien-Chuan Yang, 11F-1, No. 149, Sec. 3, Roosevelt Rd., Taipei (TW)

(*) Notice: Subject to any disclaimer, the term of this patent is extended or adjusted under 35 U.S.C. 154(b) by 0 days.

(21) Appl. No.: 10/352,949

(22) Filed: Jan. 29, 2003

(65) Prior Publication Data

US 2004/0145136 A1 Jul. 29, 2004

(51) Int. Cl.$^7$ .............................................. B62B 1/04
(52) U.S. Cl. ...................... 280/47.24; 280/40; 280/652; 280/655; 280/DIG. 6
(58) Field of Search ................. 280/40, 645, 646, 280/651, 652, 655, 655.1, DIG. 6, 47.17, 47.18, 47.23, 47.24, 47.27

(56) References Cited

U.S. PATENT DOCUMENTS

| | | | | |
|---|---|---|---|---|
| 2,518,803 A | * | 8/1950 | Marvin | 280/40 |
| 4,822,071 A | * | 4/1989 | Widegren | 280/646 |
| 4,887,835 A | * | 12/1989 | Dallaire et al. | 280/646 |
| 4,946,186 A | * | 8/1990 | Cheng | 280/646 |
| 5,180,184 A | * | 1/1993 | Chiu | 280/646 |
| 5,201,540 A | * | 4/1993 | Wu | 280/646 |
| 5,451,072 A | * | 9/1995 | Weng | 280/646 |
| 5,526,894 A | * | 6/1996 | Wang | 180/65.1 |
| 5,586,778 A | * | 12/1996 | Lindh et al. | 280/40 |
| 6,050,592 A | * | 4/2000 | Kim | 280/652 |
| 6,079,718 A | * | 6/2000 | Liao | 280/47.26 |
| 6,148,477 A | * | 11/2000 | Cheng | 16/113.1 |
| 6,364,327 B1 | * | 4/2002 | Liao | 280/40 |
| 6,481,518 B1 | * | 11/2002 | Wu | 180/65.6 |
| 6,641,228 B2 | * | 11/2003 | Liu | 301/111.06 |

* cited by examiner

Primary Examiner—Christopher P. Ellis
Assistant Examiner—Jeffrey Restifo
(74) Attorney, Agent, or Firm—Dennison, Schultz, Dougherty & MacDonald

(57) ABSTRACT

A three-sectional golf cart structure including a stretchable hand pull-bar, two struts for wheels, a "U" shaped lower stand and two links, wherein the hand pull-bar includes an inner pipe and an external sleeve; the two struts for wheels each is connected on one end thereof with a wheel; the two links both have their ends connected to the two struts for wheels and the external sleeve respectively. Thereby, when the hand pull-bar is pulled up, it moves therewith the two links to stretch out the two struts and the wheels; while down pressing of the hand pull-bar will collapse the two struts and the wheels to be received in the two lateral sides of the "U" shaped lower stand, and by stretching and retracting of the three members including the inner pipe, the external sleeve and the "U" shaped lower stand, the three-sectional golf cart structure is formed.

4 Claims, 4 Drawing Sheets

THREE-SECTIONAL GOLF CART STRUCTURE

BACKGROUND OF THE INVENTION

1. Field of the Invention

The present invention is related to a three-sectional golf cart structure, and especially to such golf cart structure which is simple in operation, able to save storage space, and is suitable to be used as a golf cart or the like.

2. Description of the Prior Art

The golf sport needs a very large ground, a golf kit is quite heavy, thereby when in striking golf balls in a golf course, generally a golf cart is used to save carrying of a golf bag on the back of a user and to alleviate loadings of him, the golf bag is placed on the golf cart to allow the user to tow the golf carts during walking.

A golf cart normally seen generally is the kind of a foldable golf cart, although it can get an effect of saving space, when a user stretch out or collapse the golf cart, the foldable device makes inconvenience of using; and more, such a foldable device makes the structure of the golf cart more complicated, and a plurality of components are added to the structure to increase the cost of production.

SUMMARY OF THE INVENTION

In view of the above stated, for improving the defective foldable golf cart to allow a user to use or to stretch out or collapse the golf cart more conveniently, the inventor studied and developed the present invention.

To get the above stated objects, the three-sectional golf cart structure provided in the present invention includes a stretchable hand pull-bar, two struts for wheels, a "U" shaped lower stand and two links; wherein the stretchable hand pull-bar includes a handle, the handle is provided therebeneath with an inner pipe which can be stretchably and retractably and movably fitted in an external sleeve. The inner pipe and the external sleeve are both provided on the inner walls of the upper and the lower portions thereof respectively with a snap latch; and the external sleeve is provided on the inner wall of the front end thereof with an engaging hole at an upper position from a corresponding snap latch. The inner pipe and the external sleeve thereby can have the snap latches of the inner pipe engaged into the engaging hole of the external sleeve during the strokes of stretching and retracting. And the upper end of the external sleeve (which is the middle section of the three-sectional golf cart structure) is connected with a fixing mount of a golf bag. The two struts for wheels each is connected on one end thereof with a wheel. The "U" shaped lower stand at least includes two lateral branch struts which form a receiving space therebetween. The above stated inner pipe and the external sleeve can be pushed down into the receiving space when they are fitted one in the other. One of the two lateral branch struts is provided on the front end thereof in corresponding to the snap latch provided on the lower inner wall of the external sleeve with an engaging hole for snap engaging the snap latch on the upper inner wall of the external sleeve therein. The "U" shaped lower stand is provided on the upper end thereof with a pivotal connecting seat for movable pivotal connection of the other end of each of the two struts with the pivotal connecting seat; the bottom end of "U" shaped lower stand is connected with a bottom support of the golf bag. The two links both have their ends connected to the middles of the inner sides of the two struts for wheels respectively, their other ends are connected to the bottom end of the external sleeve.

When the hand pull-bar is pulled up, it moves therewith the two links to stretch out the two struts for wheels and the wheels; while down pressing of the hand pull-bar will collapse the two struts for wheels and the wheels to be received in the two lateral sides of the "U" shaped lower stand, and by stretching and retracting of the three members including the inner pipe, the external sleeve and the "U" shaped lower stand, the three-sectional golf cart structure is formed.

The present invention will be apparent after reading the detailed description of the preferred embodiment thereof in reference to the accompanying drawings.

DETAILED DESCRIPTION OF THE PREFERRED EMBODIMENT

Figure 1:
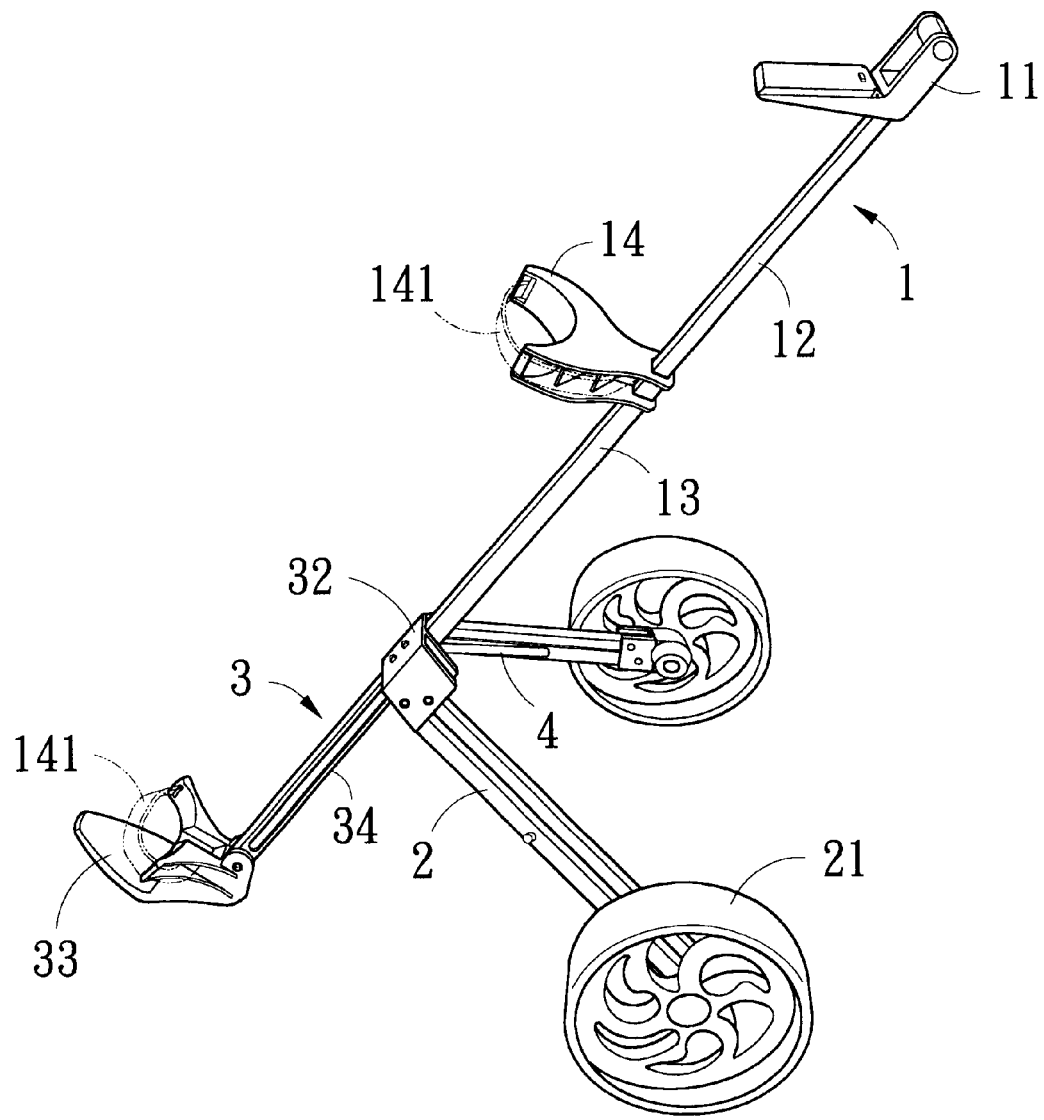
FIG. 1 is a perspective view of an embodiment of the present invention.
Figure 2:
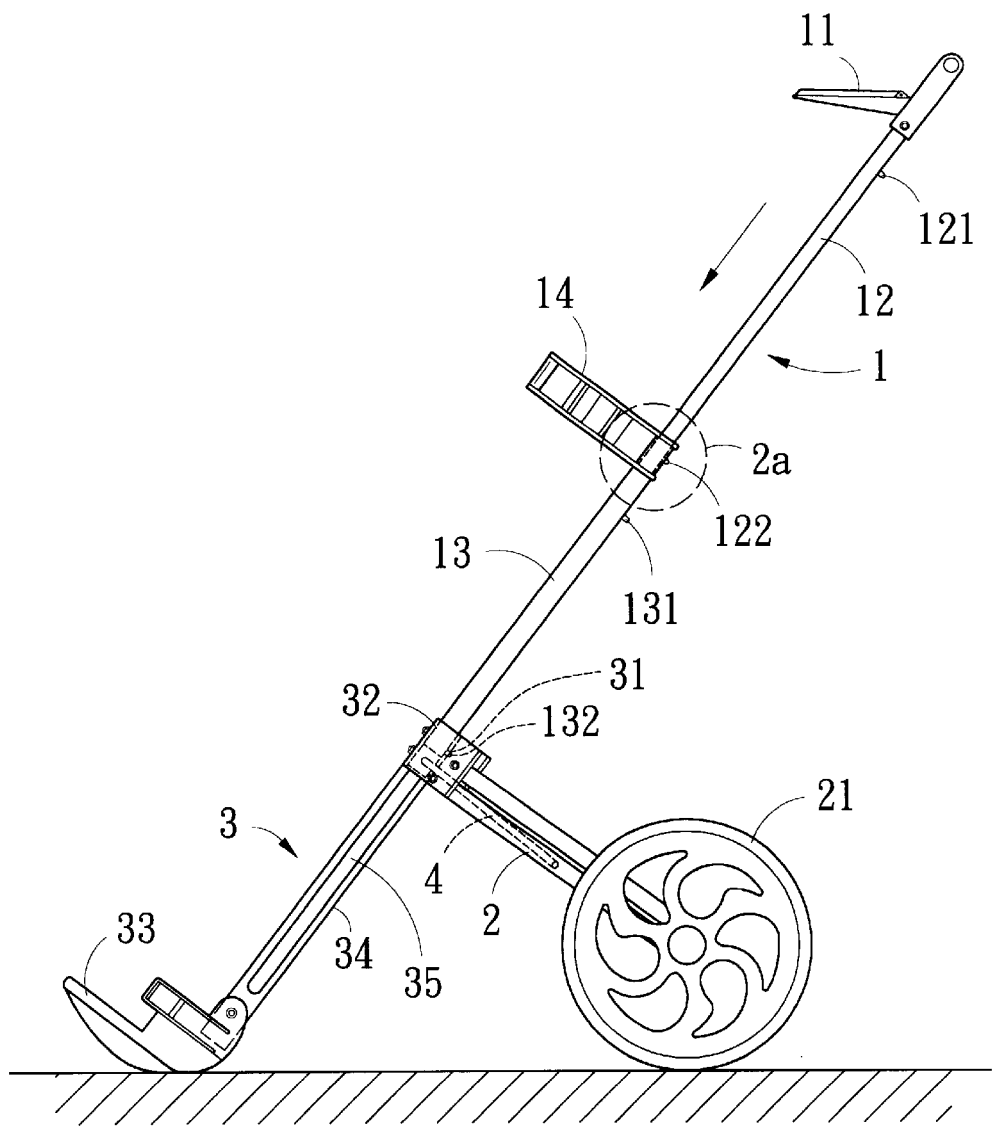
FIG. 2 is a schematic side view of the embodiment of the golf cart of the present invention, wherein, the golf cart is stretched out.

Referring to FIGS. 1, 2 showing a preferred embodiment of a three-sectional golf cart structure of the present invention, the structure comprised of a stretchable hand pull-bar 1, two struts 2 for wheels, a "U" shaped lower stand 3 and two links 4.

The stretchable hand pull-bar 1 includes a handle 11, the handle 11 is provided therebeneath with an inner pipe 12 which can be stretchably and retractably and movably fitted in an external sleeve 13. The inner pipe 12 and the external sleeve 13 are both provided on the inner walls of the upper and the lower portions thereof respectively with snap latches 121, 122, 131, 132; and the external sleeve 13 is provided on the inner wall of the front end thereof with an engaging hole 133 at an upper position from a corresponding snap latch 131. The inner pipe 12 and the external sleeve 13 thereby can have the snap latches 121, 122 of the inner pipe 12 engaged into the engaging hole 133 of the external sleeve 13 during the strokes of stretching and retracting. And the upper end of the external sleeve 13 (which is the middle section of the three-sectional golf cart structure) is connected with a fixing mount 141 of a golf bag. The fixing mount 141 of the golf bag is further provided with a fixing strap 141 to fix the golf bag.

The two struts 2 for wheels each is connected on one end thereof with a wheel 21.

The "U" shaped lower stand 3 at least includes two lateral branch struts 34 which form a receiving space therebetween. The above stated inner pipe 12 and the external sleeve 13 can be pushed down into the receiving space 35 when they are fitted one in the other. One of the two lateral branch struts 34 of the "U" shaped lower stand 3 is provided on the front end thereof in corresponding to the snap latch 133 provided on the lower inner wall of the external sleeve 13 with an engaging hole 31 for snap engaging the snap latch 131, 132 on the inner wall of the upper or the lower portion of the external sleeve 13 therein. The hand pull-bar 1 is retracted into the "U" shaped lower stand 3, the "U" shaped lower stand 3 is provided on the upper end thereof with a pivotal connecting seat 32, so that the other end of each of the two struts 2 for wheels is movably pivotally connected onto the pivotal connecting seat 32, while the bottom end of the "U" shaped lower stand 3 is connected with a bottom support 33 of the golf bag.

The two links 4 both have their ends connected to the middles of the inner sides of the two struts for wheels respectively, their other ends are connected to the bottom end of the external sleeve.

Figure 2A:
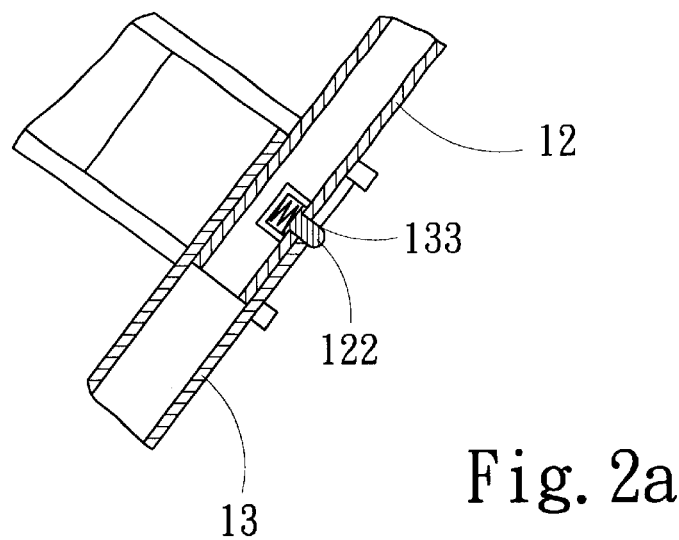
FIG. 2a is an enlarged sectional view of the embodiment of the present invention taken from FIG. 2 showing a snap latch is engaged with an engaging hole.
Figure 3:
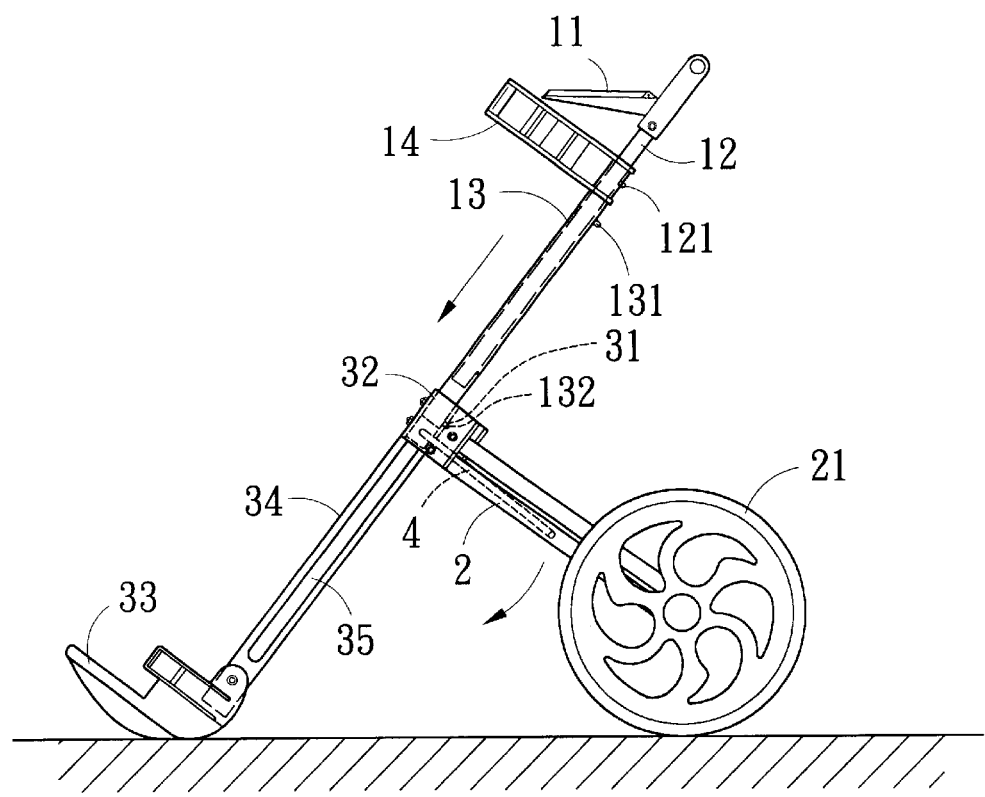
FIG. 3 is a schematic side view showing retracting of the hand pull-bar of the embodiment of the present invention.
Figure 4:
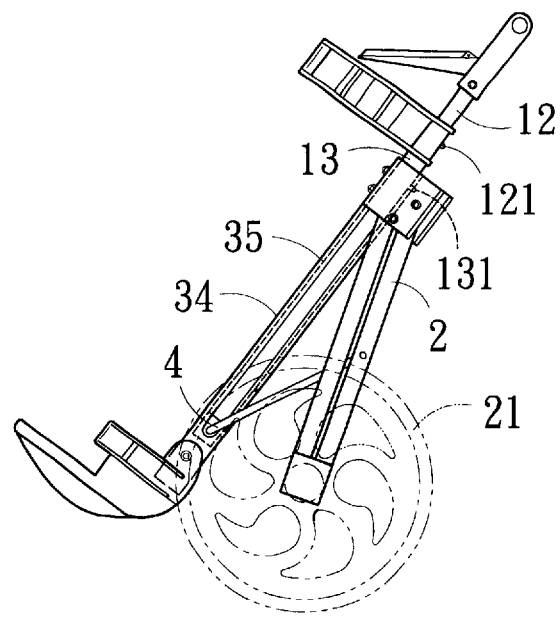
FIG. 4 is a schematic view showing the links and struts for the wheels of the embodiment of the present invention.
Figure 5:
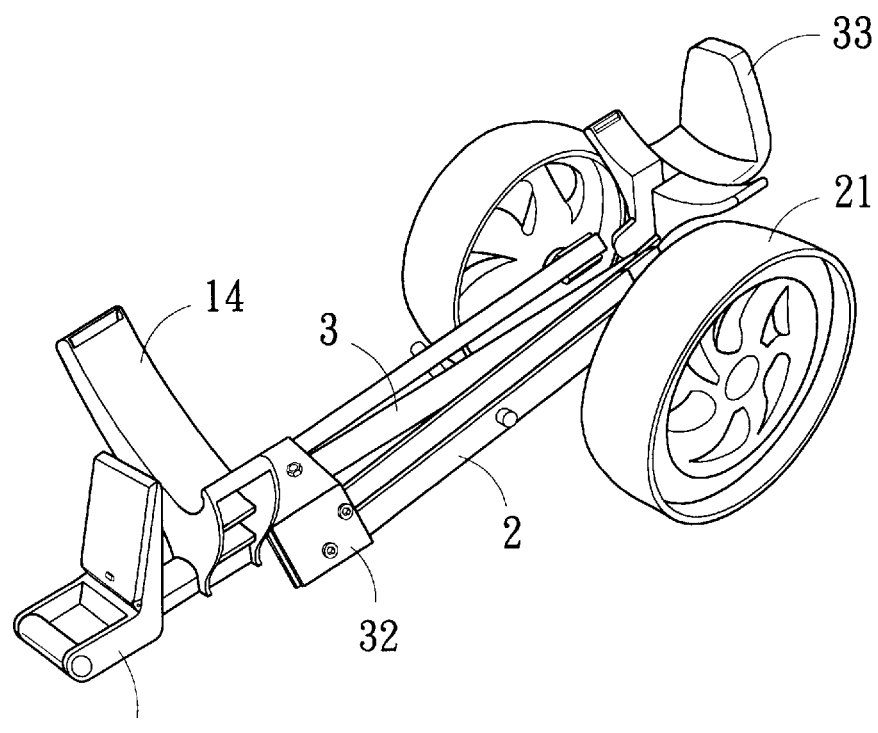
FIG. 5 is a schematic perspective view showing the golf cart structure of the embodiment of the present invention has been retracted.

Referring to FIGS. 2, 2a, when in collapsing the golf cart, the snap latch 122 engaged in the engaging hole 133 at an upper position of the external sleeve 13 is pressed down in advance, and the handle 11 is pressed down simultaneously, at this time, the inner pipe 12 moves into the external sleeve 13 by down pressing of the handle 11, until the snap latch 121 provided on the inner walls of the upper portion of the inner pipe 12 is engaged in the engaging hole 133 at the upper position of the external sleeve 13 (as shown in FIG. 3); and by pressing the snap latch 132 having been engaged in the upper engaging hole 31 above a lateral branch strut 34, and further pressing the handle 11, the inner pipe 12 and the external sleeve 13 are pushed down into the receiving space 35 when they are fitted one in the other by down pressing of the handle 11 till the snap latch 131 provided on the upper portion of the external sleeve 13 is engaged in the upper engaging hole 31 above a lateral branch strut 34. In the same time, when down moving of the external sleeve 13 moves the links 4 to make the two struts 2 and the wheels 21 at the two sides collapse and move in the "U" shaped lower stand 3 to form a collapse state (as shown in FIGS. 4, 5).

When the golf cart is used, it needs only to do the operation in the contrary sequence as of the above stated mode to sequentially draw out the external sleeve 13 and the inner pipe 12, and a stretched out state of the golf cart is obtained.

The structure of the present invention thereby has the following practical advantages:
1. The present invention is convenient for operation, a user needs only to press the snap latches to easily stretch out and collapse the golf cart, there is no overly large power and time required as is the case of a foldable golf cart.
2. The three-sectional golf cart structure of the present invention can allow the golf cart to be collapsed into the minimum volume when not in use, it is convenient for carrying or storage and does not occupy too much space.
3. As compared to a foldable golf cart, the present invention can achieve the purpose of collapsing the golf cart by only the snap engagement of snap latches with engaging holes, such device can reduce the cost of production and can have a good effect in collapsing the golf cart.

Accordingly, the present invention sure can get the expected object thereof to provide a three-sectional golf cart structure; having thus described my invention with industrial value, what I claim as new and desire to be secured by letters patent of the united states are:

What is claimed is:

1. A three-sectional golf cart structure comprising:

a stretchable hand pull-bar having a handle, said handle is provided therebeneath with an inner pipe which is adapted to stretchably and retractably and movably fitting in an external sleeve which is the middle section of said three-sectional golf cart structure, the upper end of said external sleeve is connected with a fixing mount of a golf bag;

two struts for wheels each being connected on one end thereof with a wheel;

a "U" shaped lower stand including two lateral branch struts which form a receiving space therebetween, said inner pipe and said external sleeve are adapted to being pushed down into said receiving space when they are fitted one in the other, said "U" shaped lower stand is provided on the upper end thereof with a pivotal connecting seat, the other end of each of said two struts is movably pivotally connected onto said pivotal connecting seat, while the bottom end of said "U" shaped lower stand is connected with a bottom support of said golf bag; and two links both having their ends connected to the middles of the inner sides of said two struts respectively, the other ends of said two links are connected to the bottom end of said external sleeve, whereby movement of said hand pull-bar upwardly moves said two links and said wheels into a stretched out position; while down pressing of said hand pull-bar collapses said two struts to be received in the two lateral sides of said "U" shaped lower stand in a retracted position.

2. The three-sectional golf cart structure as stated in claim 1, wherein: said fixing mount of said golf bag is provided with a fixing strap to fix said golf bag.

3. The three-sectional golf cart structure as stated in claim 1, wherein: said inner pipe of said stretchable hand pull-bar is provided on the inner wall of the upper and the lower portions thereof respectively with a snap latch; and said external sleeve is provided on the inner wall of the front end thereof with an engaging hole at an upper position from a corresponding one of said snap latches, said inner pipe and said external sleeve thereby make said snap latches engage into said engaging hole during the strokes of stretching and retracting.

4. The three-sectional golf cart structure as stated in claim 1, wherein: said external sleeve is provided on the inner wall of the upper and the lower portions thereof respectively with a snap latch, one of said two lateral branch struts of said "U" shaped lower stand is provided on the front end thereof in corresponding to one of said snap latches provided on the lower inner wall of said external sleeve with an engaging hole for snap engaging said snap latches on the inner wall of said upper or said lower portion of said external sleeve therein.

* * * * *